US007590382B2

(12) United States Patent
Schedivy

(10) Patent No.: US 7,590,382 B2
(45) Date of Patent: Sep. 15, 2009

(54) ENTERTAINMENT SYSTEM FOR USE IN A VEHICLE

(75) Inventor: George C. Schedivy, Aquebogue, NY (US)

(73) Assignee: Audiovox Corporation, Hauppauge, NY (US)

( * ) Notice: Subject to any disclaimer, the term of this patent is extended or adjusted under 35 U.S.C. 154(b) by 440 days.

(21) Appl. No.: 11/012,524

(22) Filed: Dec. 15, 2004

(65) Prior Publication Data

US 2006/0128303 A1    Jun. 15, 2006

(51) Int. Cl.
*H04H 40/00* (2008.01)
(52) U.S. Cl. .................................... 455/3.06; 348/837
(58) Field of Classification Search ................ 455/3.06, 455/569.2, 575.9, 99, 344, 345, 3.02, 152.1, 455/153.1, 153.2, 575.1; 348/837; 296/24.34, 296/24.3
See application file for complete search history.

(56) References Cited

U.S. PATENT DOCUMENTS

| 5,040,990 | A |   | 8/1991  | Suman et al. ................. 439/34  |
|-----------|---|---|---------|---------------------------------------|
| 5,469,298 | A |   | 11/1995 | Suman et al. ................ 359/630  |
| D391,926  | S |   | 3/1998  | Brunner et al. ............ D14/100    |
| D394,432  | S |   | 5/1998  | Rosen ....................... D14/132  |
| 5,775,762 | A |   | 7/1998  | Vitito ........................ 296/37.7 |
| D399,200  | S |   | 10/1998 | Rosen ....................... D14/132  |
| D399,503  | S |   | 10/1998 | Rosen ....................... D14/132  |
| 5,822,023 | A | * | 10/1998 | Suman et al. ............... 348/837   |
| 5,927,784 | A |   | 7/1999  | Vitito ........................ 296/37.7 |
| 5,946,055 | A |   | 8/1999  | Rosen ........................ 348/837 |
| D413,856  | S |   | 9/1999  | Scribner .................... D12/418  |
| 6,059,255 | A |   | 5/2000  | Rosen et al. ................ 248/917  |
| D430,545  | S |   | 9/2000  | Rosen ....................... D14/132  |
| 6,125,030 | A |   | 9/2000  | Mola et al. .................. 361/681 |
| 6,181,387 | B1 |  | 1/2001  | Rosen ........................ 348/837 |
| 6,186,459 | B1 |  | 2/2001  | Ma ........................... 248/276.1 |
| D451,895  | S |   | 12/2001 | Lavelle et al. .............. D14/132 |
| 6,338,517 | B1 |  | 1/2002  | Canni et al. ................. 296/37.8 |
| 6,339,455 | B1 |  | 1/2002  | Allan et al. .................. 348/837 |
| D453,325  | S |   | 2/2002  | Okada et al. ............... D14/132 |
| D454,121  | S |   | 3/2002  | Lavelle et al. .............. D14/132 |
| D455,130  | S |   | 4/2002  | Skaff et al. ................. D14/126 |
| D462,670  | S |   | 9/2002  | Kasuga et al. .............. D14/132 |
| D467,562  | S |   | 12/2002 | Chang ....................... D14/132 |
| D468,711  | S |   | 1/2003  | Chang ....................... D14/129 |
| D489,044  | S |   | 4/2004  | Bremenkamp et al. ..... D14/132 |

(Continued)

FOREIGN PATENT DOCUMENTS

WO    WO 00/38951    7/2000

OTHER PUBLICATIONS

International Search Report from corresponding PCT Application No. PCT/US2005/44493.

(Continued)

*Primary Examiner*—Tu X Nguyen
(74) *Attorney, Agent, or Firm*—F. Chau & Associates, LLC

(57) ABSTRACT

An entertainment system for a vehicle comprises a console section mounted on a surface in the vehicle, a media source layer including a media source mounted on the console section, and a screen section mounted on the media source layer, wherein the screen section includes a display and is capable of being mounted on the console section when the media source layer is removed from the console section.

13 Claims, 15 Drawing Sheets

U.S. PATENT DOCUMENTS

| | | | |
|---|---|---|---|
| 6,727,606 B2 | 4/2004 | Schopp et al. | |
| 2001/0005083 A1 | 6/2001 | Serizawa et al. | 296/37.8 |
| 2002/0113451 A1 | 8/2002 | Chang | 296/37.7 |
| 2002/0140289 A1 | 10/2002 | McConnell et al. | |
| 2002/0149708 A1* | 10/2002 | Nagata et al. | 348/837 |
| 2002/0163215 A1* | 11/2002 | Emerling et al. | 296/24.1 |
| 2003/0168875 A1 | 9/2003 | Anderson et al. | 296/37.8 |
| 2004/0061358 A1 | 4/2004 | Vishey et al. | 296/214 |
| 2004/0175155 A1* | 9/2004 | Liu | 386/125 |
| 2005/0231008 A1* | 10/2005 | Jaaska | 297/188.2 |

OTHER PUBLICATIONS

Office Action mailed Mar. 2, 2009 from corresponding continuation U.S. Appl. No. 12/103,569.

International Preliminary Report on Patentability of PCT Application PCT/US05/44493 dated Sep. 5, 2008.

* cited by examiner

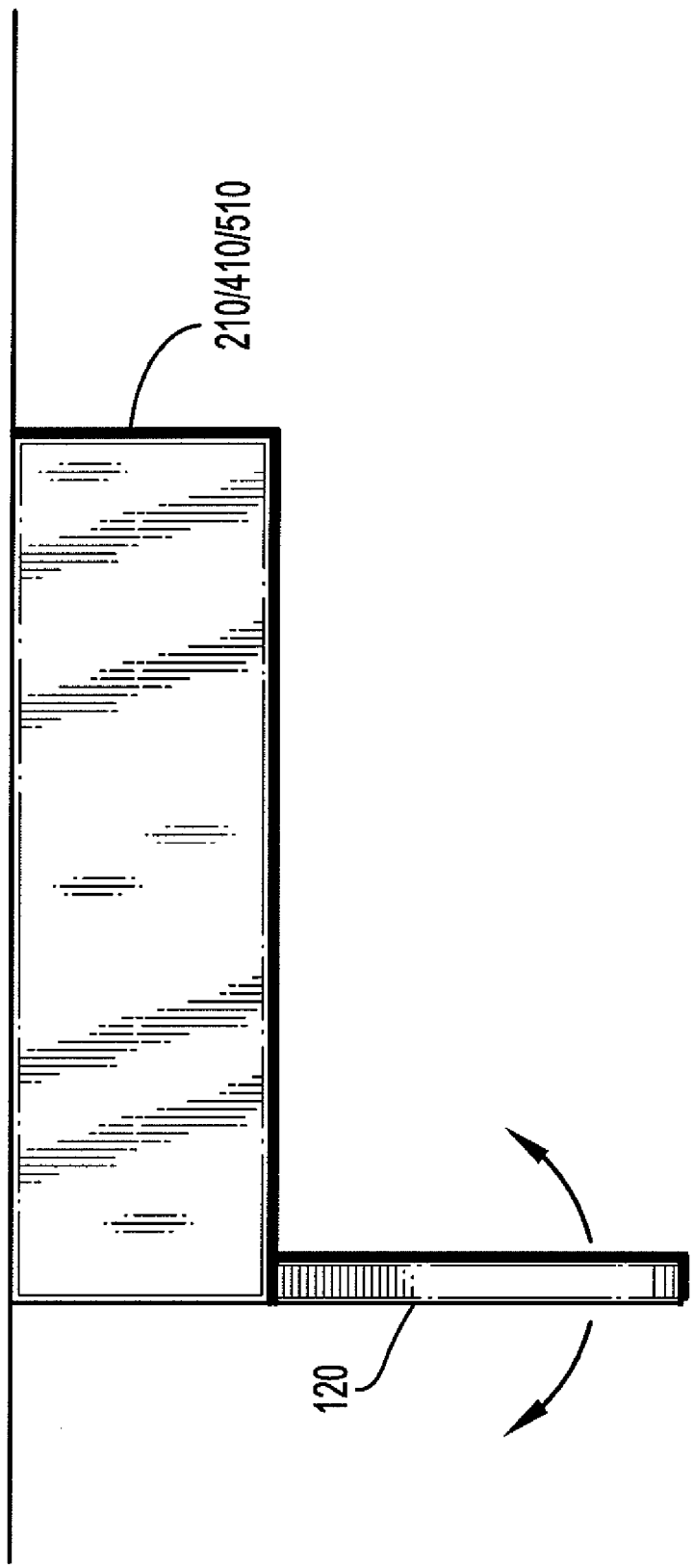

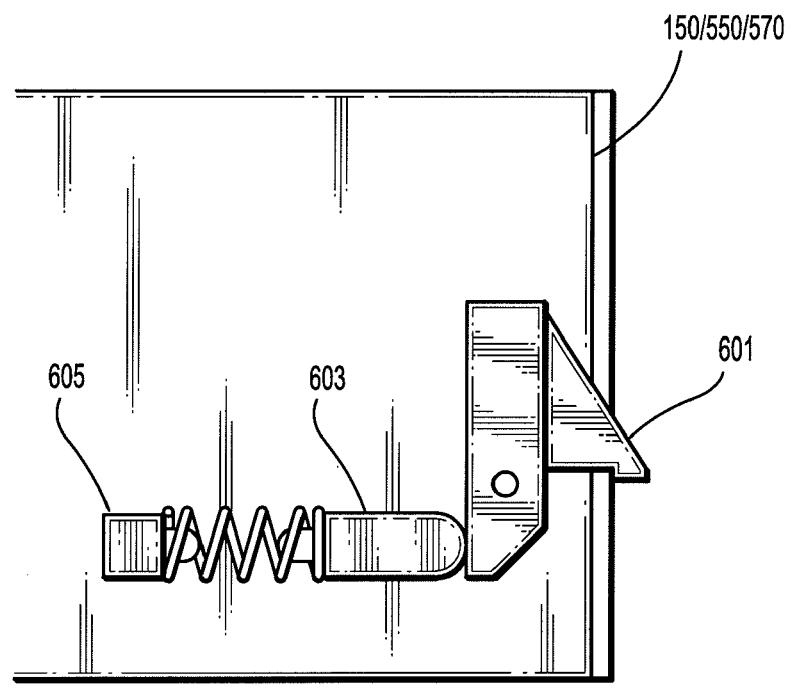
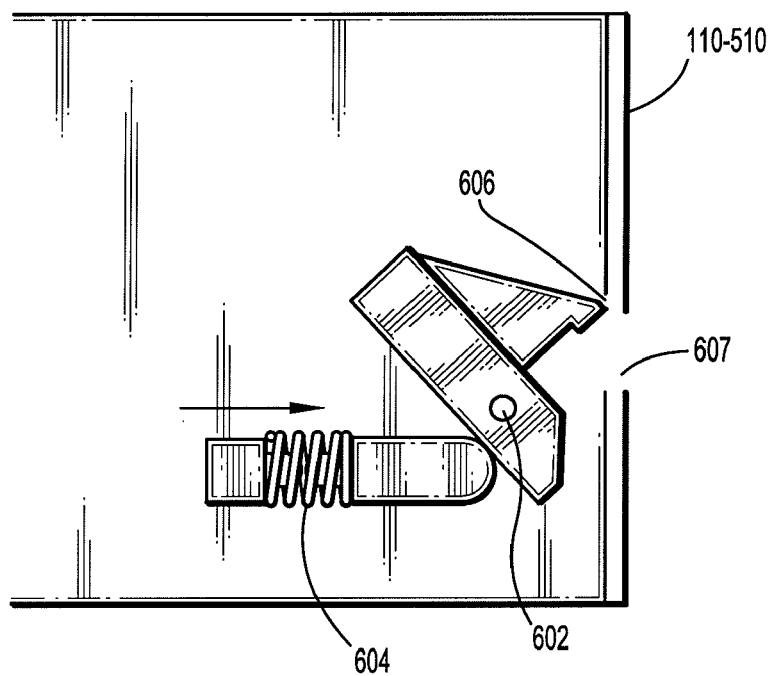
FIG. 12A

ENTERTAINMENT SYSTEM FOR USE IN A VEHICLE

BACKGROUND OF THE INVENTION

1. Technical Field

The present disclosure relates to an entertainment system for use in a vehicle, and more particularly to a layered entertainment system capable of receiving and supporting a media source.

2. Discussion of the Related Art

Entertainment consoles mounted in vehicles provide video and audio entertainment to passengers therein. A known design includes, for example, an overhead console including a screen for displaying video and a media source built-in to the overhead console, such as a digital video disc (DVD) player. Another known design includes, for example, the overhead console including the screen for displaying video and a media source, such as a video cassette player (VCP), connected to the overhead console, but positioned remote from the console, such as under a seat of the vehicle.

Known consoles are limited with respect to how and where a media source is positioned in a vehicle and the number and type of media sources that can be operated with the console.

Accordingly, a need exists for an overhead console that can operate with multiple media sources and that provides flexibility with respect to positioning and mounting of the media sources.

SUMMARY OF THE INVENTION

An entertainment system for a vehicle, in accordance with an embodiment of the present invention, comprises a console section mounted on a surface in the vehicle, a media source layer including a media source mounted on the console section, and a screen section mounted on the media source layer, wherein the screen section includes a display and is capable of being mounted on the console section when the media source layer is removed from the console section.

The surface may be an overhead surface of the vehicle. The media source may include at least one of a DVD player, a CD-ROM player, a video game player, a VCP, a television tuner, a radio tuner, a wireless receiver and tuner for playing media received via wireless techniques, an MPEG player, a portable personal computer, a digital video recorder, or a device for playing media supplied from a mass storage device. The wireless techniques may include at least one of 802.11, Bluetooth, cellular transmission and satellite transmission.

The console section may include an electrical connector for mating with an electrical connector on the media source layer for electrically connecting the media source layer to the console section. The media source layer may receive power from a power supply of the vehicle via the electrical connectors.

The media source layer may include an electrical connector for mating with an electrical connector on the screen section for electrically connecting the media source layer to the screen section and the display.

An additional media source layer may be mounted on the media source layer between the media source layer and the screen section, whereby the screen section is mounted on the additional media source layer.

The media source layer can be capable of being mounted on the console section such that a front panel of the media source layer faces the same direction as a front, a side or a rear of the vehicle.

A media source may be positioned remote from the media source layer and the console and screen sections and electrically connected to the display.

The entertainment system may further include a selector for selecting whether a program from the media source of the media source layer or from the remote media source is supplied to the display. The remote media source may be electrically connected to the display via a wiring harness or via wireless transmission and reception.

An entertainment system for a vehicle, in accordance with an embodiment of the present invention, comprises a housing, a display mounted to the housing, a first media source positioned remote from the housing and electrically connected to the display, and at least one cavity in the housing for receiving a media source layer, wherein the media source layer includes a second media source and is electrically connected to the display through the housing.

The housing may include an electrical connector for mating with an electrical connector on the media source layer and for electrically connecting the media source layer to the display.

The media source layer may be secured in the housing with a hook member, a latch mechanism, Velcro, snaps or by press fitting a portion of media source layer into a portion of the housing.

The housing may be mounted to a surface in the vehicle and the at least one cavity can be positioned between the display and a part of the housing contacting the surface.

The entertainment system may further comprise at least one other cavity in the housing for receiving another media source layer. The at least one other cavity may be stacked on the at least one cavity or positioned on a side of the at least one cavity.

The at least one cavity may be accessed from a front, a side, a back or from both a front and a side of the housing.

An entertainment system for a vehicle, in accordance with an embodiment of the present invention, comprises a housing mounted to a surface in the vehicle, a display mounted to the housing, and at least one cavity in the housing for receiving a media source layer, wherein the media source layer includes a media source and is electrically connected to the display, and the at least one cavity is positioned between the display and a part of the housing contacting the surface.

The surface may be an overhead surface of the vehicle. The entertainment system may further comprise a media source positioned remote from the housing and electrically connected to the display.

BRIEF DESCRIPTION OF THE DRAWINGS

Preferred embodiments of the invention can be understood in more detail from the following descriptions taken in conjunction with the accompanying drawings in which:

FIG. 11 shows a side view of any one of the entertainment units shown in FIGS. 5, 8 and 9, according to embodiments of the present invention; and FIGS. 12A-12E show devices for securing a media source layer to a housing of an entertainment unit according to embodiments of the present invention.

DETAILED DESCRIPTION OF THE PREFERRED EMBODIMENTS

Preferred embodiments of the present invention will be described below in more detail with reference to the accompanying drawings. This invention may, however, be embodied in different forms and should not be construed as limited to the embodiments set forth herein. Rather, these embodiments are provided so that this disclosure will be thorough and complete, and will fully convey the scope of the invention to those skilled in the art.

Figure 1:
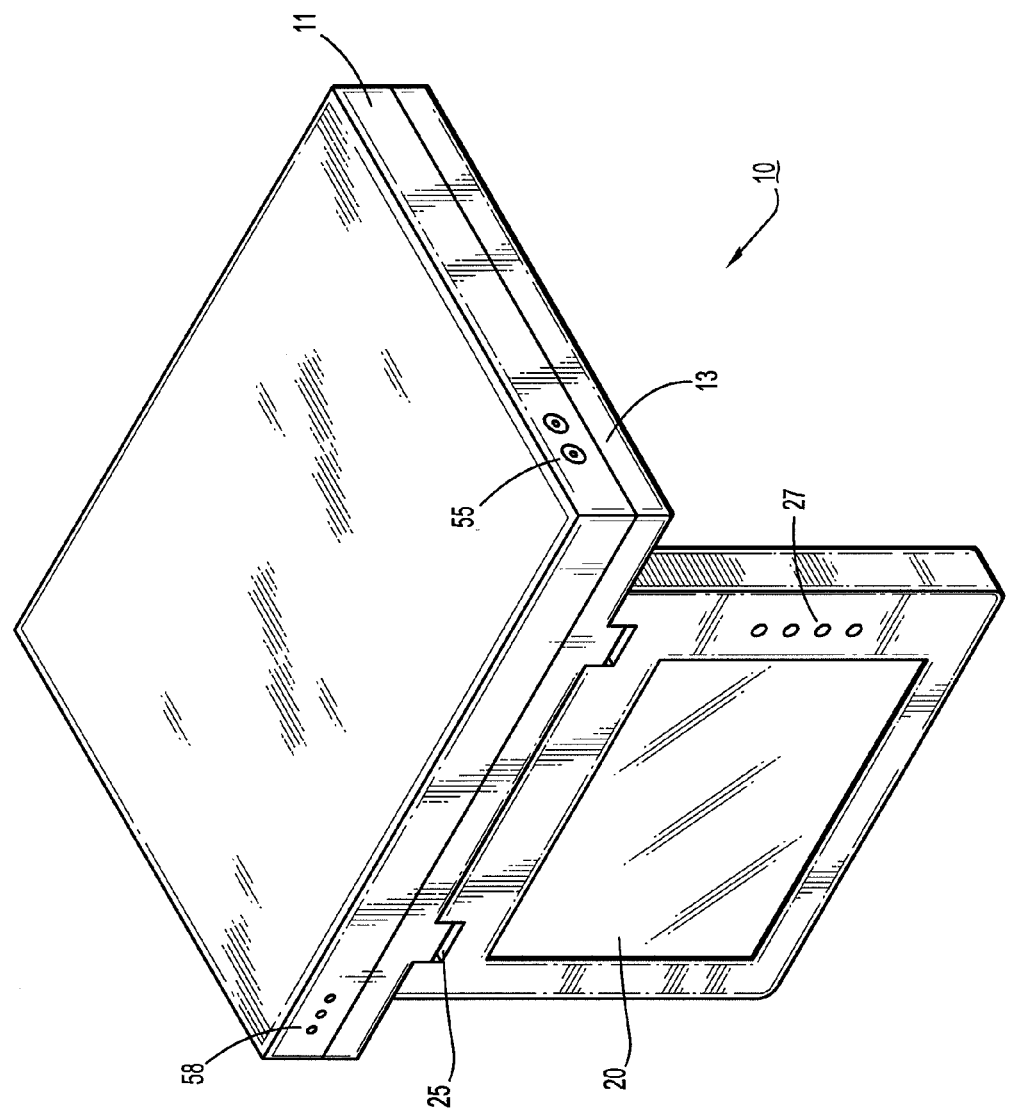
FIG. 1 shows a perspective view of an entertainment unit according to an embodiment of the present invention.

Referring to FIG. 1, an entertainment unit 10 includes a console section 11 and a screen section 13. The console section 11 is preferably mounted overhead to a ceiling of a vehicle. The screen section 13 is mounted to the console section 11 using screws, bolts, clips and/or another suitable mounting mechanism known to one of ordinary skill in the art. Also, the screen section 13 may be mounted to a trim-ring on the console section 11.

The entertainment unit 10 includes a display 20 on the screen section 13. The display 20 is preferably a liquid crystal display (LCD). Alternatively, the display 120 can be a cathode ray tube (CRT), gas plasma display, a light emitting diode (LED) display, an organic LED (OLED) display, or an electro-luminescent display. The display 20 is preferably supported from the screen section 13 by hinged mechanisms 25, swings to different viewing angles and folds flat against the screen section 13 of the entertainment unit 10 when not in use. The display 20 is capable of swinging in front and rear directions over a range of approximately 180 degrees. The display 20 is shown positioned at a front portion of the entertainment unit 10. Alternatively, the display may be positioned at a center or rear portion of the entertainment unit 10. The display 20 includes buttons 27 for controlling such functions as display power, picture characteristics (e.g., brightness, contrast) and volume (e.g., to control sound associated with a video program displayed on the display when the display includes a speaker).

The console section 11 includes ports 55, such as audio/video input/output jacks.

The entertainment unit 10 is connected to a remote media source, such as a VCP located under a vehicle seat. The remote media source provides video and/or audio to the entertainment unit 10 and the display 20. The remote media source can be connected to the entertainment unit 10 via the vehicle's wiring harness or through wireless techniques. For example, the remote media source may include a wireless transmitter for wirelessly transmitting video and/or audio signals to a receiver of the entertainment unit 10 for receiving video and/or audio programming for broadcast through the entertainment unit 10 on, for example, the display 20.

The entertainment unit 10 can be coupled to a vehicle's electrical system and receive power from the vehicle's power supply, e.g. 12 volts, through the wiring harness.

Figure 2:
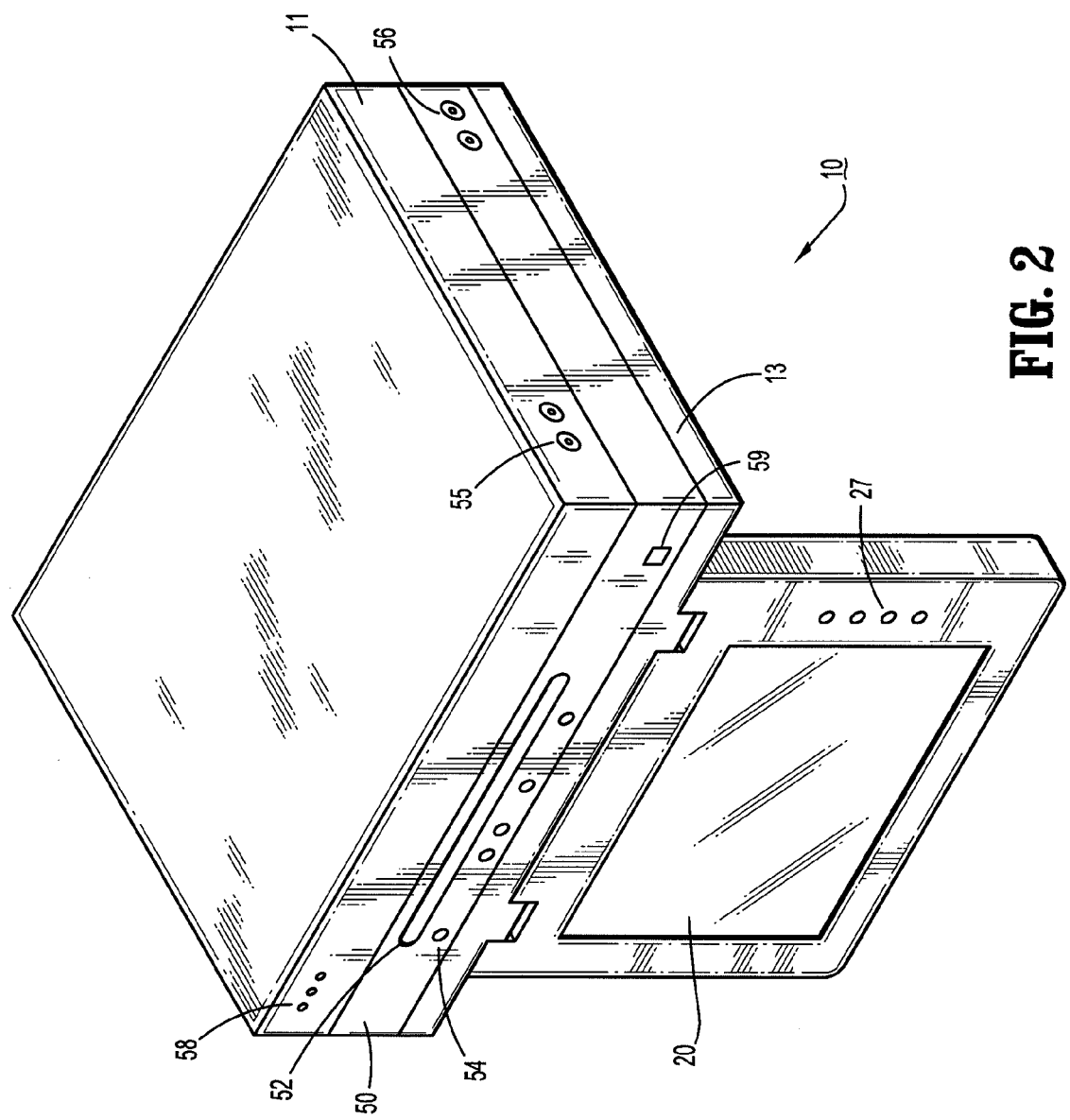
FIG. 2 shows a perspective view of the entertainment unit of FIG. 1 including a media source layer positioned between screen and console sections.

Referring to FIG. 2, a media source layer 50 is mounted between the console section 11 and screen section 13. Like the mounting of the screen section 13 to the console section 11 shown in FIG. 1, the media source layer 50 is mounted to the console section 11 using screws, bolts, clips and/or another suitable mounting mechanism known to one of ordinary skill in the art. Also, the media source layer 50 may be mounted to a trim-ring on the console section 11. In turn, the screen section 13 is mounted to the media source layer 50 using screws, bolts, clips and/or another suitable mounting mechanism known to one of ordinary skill in the art.

The media source layer 50 is sized to fit between the console and screen sections 11, 13 such that the sides of the media source layer are flush or substantially flush with the sides of the console and screen sections.

Upon installation into a vehicle, the console and screen sections 11, 13 and the media source layer 50 can be directly wired to each other and the console section wired to the vehicle's wiring harness. As an alternative, the console and screen sections 11, 13 and the media source layer 50 can each be wired to the vehicle's wiring harness. As a further alternative, the console section 11 can be wired to the vehicle's wiring harness, while the console and screen sections 11, 13 and the media source layer 50 are equipped with electrical connectors, such as electrical connector 801 shown in FIGS. 3 and 6, for creating interconnections between sections and between the media source layer and sections. The electrical connector 801 can be a pin array, an F-connector, an RCA jack, an S-connector, an XLR jack and the like. It should also be noted that the console section 11 can be connected to the wiring harness via an electrical connector 801 positioned on the ceiling for mating with a corresponding electrical connector 801 on the console section 11.

Power and data, such as video and audio, are transferred via the electrical connectors. Thus, a media source(s) included in a media source layer 50 can be connected to external devices through the electrical connectors and the wiring harness. The external devices include, for example, a slave video display unit installed in another part of the vehicle, a security system, and a vehicle sound system.

A media source layer 50 may also be connected to the vehicle's power supply through the electrical connectors and the wiring harness. A media source layer 50 can also be connected to a vehicle's data communication bus, which can carry data from and to a media source layer to and from the external devices.

The display 20 of the entertainment unit 10 can be operatively coupled to the media source of the media source layer 50 directly via wires or, for example, electrical connectors like electrical connector 801. Similarly, a remote media source can be operatively coupled to the display 20 through the vehicle's wiring harness and electrical connectors 801 located on the console and screen sections 11 and 13 and the media source layer 50.

For example, the console section 11 may have an electrical connector on its underside for mating with a corresponding connector on the top of the media source layer 50 or the screen section 13 when the media source layer 50 or the screen section 13 is positioned against the console section 11. Similarly, the underside of the media source layer 50 may include an electrical connector for mating with a corresponding connector on the top of the screen section 13 when the screen section 13 is positioned against the media source layer 50.

Transfer of data may be obtained through electrical connectors, such as connector 801. For example, video signals from a media source layer 50 can be provided via the electrical connectors to the display 20 coupled to the housing for producing a video image on the display 20. Similarly, audio data may be transferred through the connectors to the display 20, speakers and/or headphones coupled to the entertainment unit 10 for producing sound associated with a video image.

Further, audio and video data may be sent to displays, speakers or headphones remote from the entertainment unit 10 via wireless transmission. As shown in FIG. 2, the console section 11 includes a wireless transmitter(s) 58 for wirelessly transmitting video and/or audio data to remote displays, speakers and/or headphones from a media source. The wireless transmitter(s) may include a radio frequency (RF) transmitter, an optical transmitter (e.g. an infra-red (IR) transmitter), or a combination thereof.

As shown in FIG. 2, the media source layer 50 includes a slot 52 for receiving media, such as a DVD, control buttons 54 for controlling playing of the media (e.g., stop, play, fast-forward, rewind) and audio/video input/output ports 56. The orientation of the media source layer 50 may be varied according to the preference of a user, such that access to controls, ports and/or insertion points for media can face the rear, front or sides of the vehicle. Further, more than one media source layer can be positioned between the console and screen sections 11 and 13.

The entertainment unit 10 is capable of operating with only the remote media source, the remote media source together with a media source layer(s) or only the media source layer(s). If operating with both the remote media source and the media source layer, or more than one media source layer, the entertainment unit may include a selector switch/button on, for example, the display 20, for selecting the source of video and/or audio signals.

Multiple passengers in a vehicle may simultaneously view separate programs on different displays and/or listen to different programs through different audio mechanisms (e.g., through separate headphone sets).

For example, multiple media source layers can provide different video programs to two respective displays. Specifically, a first media source layer may provide a first program via electrical connectors, such as connector 801 to display 20, and a second media source layer may provide a second video program to another display positioned remote from the entertainment unit 10 and electrically connected to the second media source layer via electrical connector 801 and the vehicle's wiring harness. Program transmission may also occur between the media source layers and multiple displays via wireless transmission, wherein each program is transmitted on a different channel and/or encoded to avoid interference.

Alternatively, a first program may be provided to a first display from a media source layer positioned between the console and screen sections 11, 13 and a second program may be provided to a second display from a media source remote from the entertainment unit 10.

Each media source layer 50 includes a media source such as a DVD player, a CD-ROM player, a video game player, a VCP, a television or radio tuner, a wireless receiver and tuner for playing media received via wireless techniques such as 802.11, Bluetooth®, cellular transmission, including Code Division Multiple Access (CDMA) or other technology using spread-spectrum techniques, and satellite transmission, an MPEG player, a portable personal computer, or a digital video recorder (DVR) or similar device capable of downloading, recording, storing (e.g., on a storage device, such as a hard disk) and/or playing video and/or audio files or programs. The portable personal computer can include, for example, capability to receive and transmit e-mail and access the Internet via wireless techniques.

The media source may also include a device for playing media supplied from a mass storage device, wherein the mass storage device includes, for example, a memory card or a keydrive. The media source layer may also include any combination of the above media sources. Media source layer 50 is illustrated with a DVD player.

Figure 3:
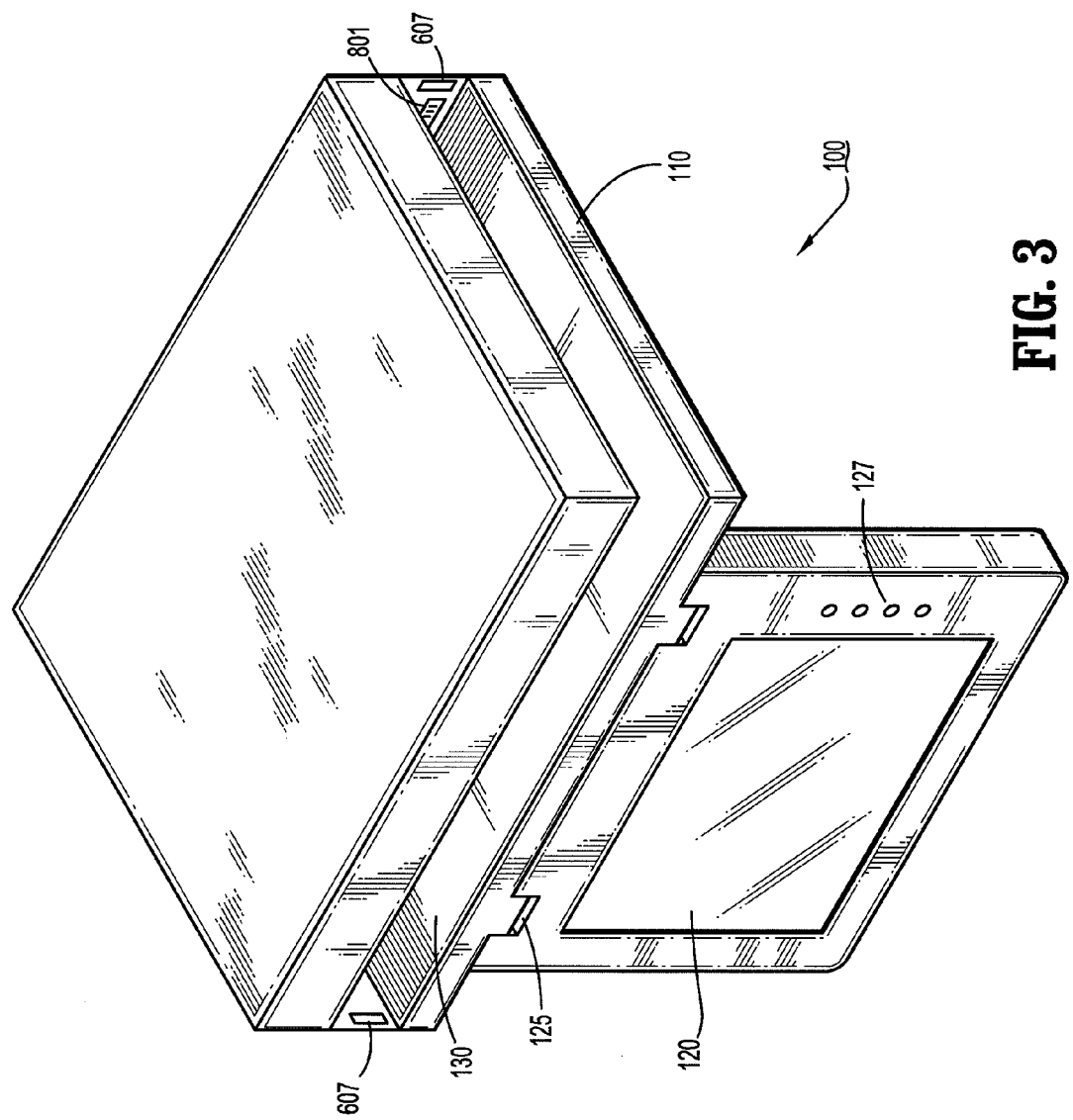
FIG. 3 shows a perspective view of an entertainment unit, according to an embodiment of the present invention.

Referring to FIG. 3, an entertainment unit 100 includes a display 120, which is preferably an LCD. Alternatively, the display 120 can be a CRT, gas plasma display, an LED display, an OLED display, or an electro-luminescent display. The display 120 is preferably supported from the entertainment unit 100 by hinged mechanisms 125, swings to different viewing angles and folds flat against a housing 110 of the entertainment unit 100 when not in use. As shown in FIG. 11, the display 120 is capable of swinging in front and rear directions over a range of approximately 180 degrees. The display 120 is shown positioned at a front portion of the entertainment unit 100.

Alternatively, the display may be positioned at a center or rear portion of the entertainment unit 100. The display 120 includes buttons 127 for controlling such functions as display power, picture characteristics (e.g., brightness, contrast) and volume (e.g., to control sound associated with a video program displayed on the display when the display includes a speaker).

Figure 4:
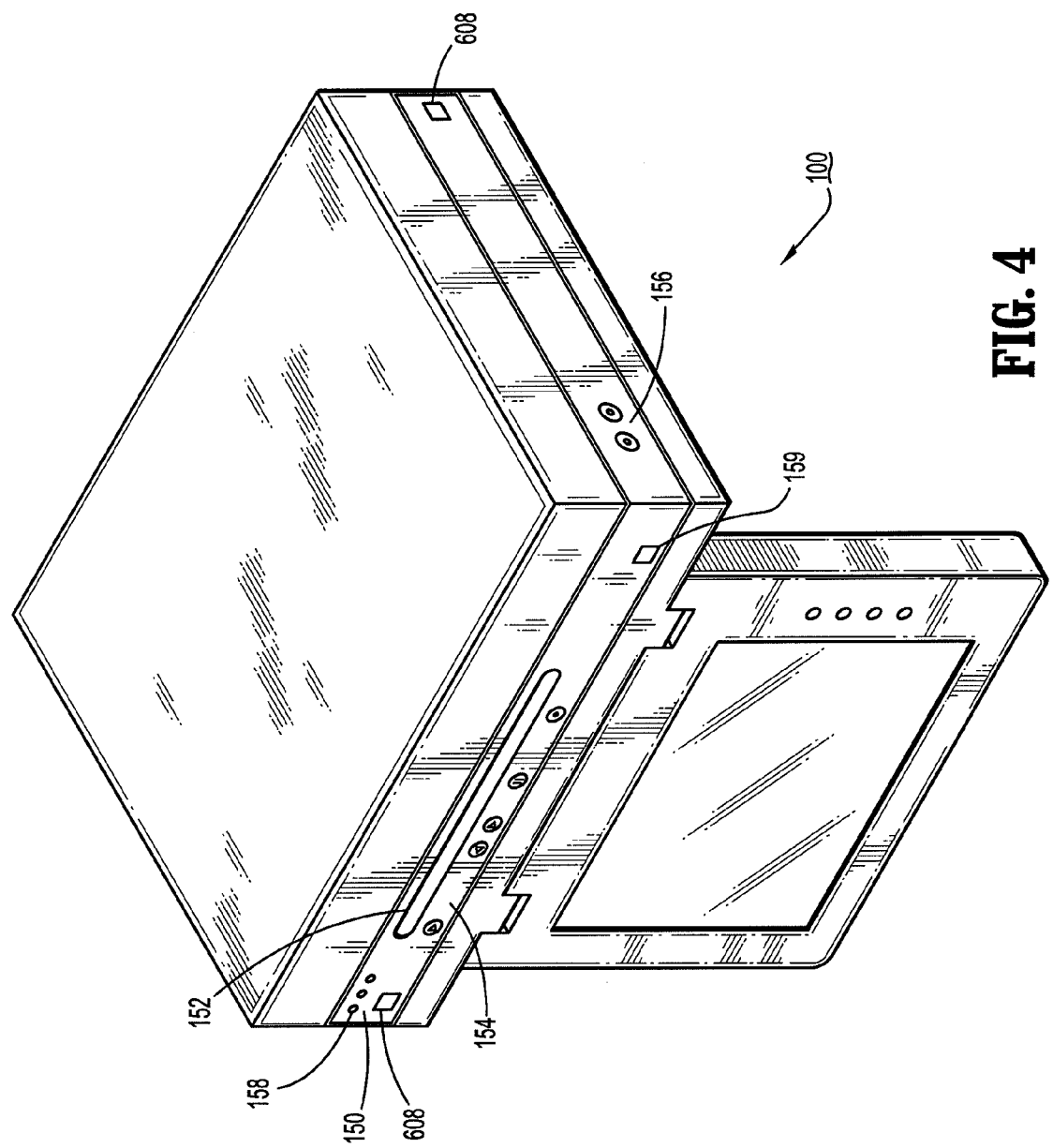
FIG. 4 shows a perspective view of the entertainment unit of FIG. 3 including a media source layer positioned therein, according to an embodiment of the present invention.

The entertainment unit 100 includes cavity 130 for receiving a media source layer 150. Referring to FIG. 4, the media source layer 150 is a module or section that fits in the cavity 130.

As shown in FIGS. 5-9, cavities 230, 330, 430, 440, 530 and 540 of entertainment units 200-500 are also capable of accommodating media source layers. The cavities 130, 230, 330, 430, 440, 530 and 540 are positioned between the display and an upper portion of each housing. The cavities of each entertainment unit include different configurations and sizes for accommodating different media source layers and/or varying the position of a media source layer.

For example, the cavity 130 of entertainment unit 100 includes a hollowed out area in the center of the housing 110 and is accessed via open portions of a front wall and a side wall of the housing 110. Referring to FIG. 4, the media source layer 150 fits into the cavity 130 such that front and side portions of the media source layer 150 sit flush or substantially flush with the front and side walls of the housing 110. As a result, slots 152 for receiving media such as a DVD, controls 154 for controlling playing of the media (e.g., stop, play, fast-forward, rewind) and/or ports 156 (e.g., audio/video input/output ports) located on the front and side portions of the media source layer 150 are accessible by a user from front and side portions of the entertainment unit 100.

As shown in FIGS. 3 and 12A, the entertainment unit 100 includes holes 607 on, for example, back and side walls of the housing 110 for receiving a hook member 601, which secures the media source layer 150 to the housing 110.

As shown in FIG. 12A, when a spring 604 is compressed, the hook member 601 is angled around a pivot point 602 to allow for placement of the hook member 601 through hole 607 upon insertion of the media source layer 150 into the cavity 130. When the spring 604 is no longer compressed, the hook member reverts back to a rest position where the hook member 601 is secured through hole 606 of the media source layer 150 and hole 607 of the housing 110. As shown in FIGS. 4 and 12A, the spring 604 can be compressed by pressing a button 608 on a wall of the media source layer 150. The button 608, in turn, engages member 605 which compresses the spring 604, which then pushes member 603 against the hook member 601 to pivot hook member 601 around the pivot point 602. The media source layer 150 is freely removable from the housing 110 by pressing the button 608 to angle the hook member 601 so that it may pass through the hole 607 as the media source layer is removed from the housing 110.

Figure 5:
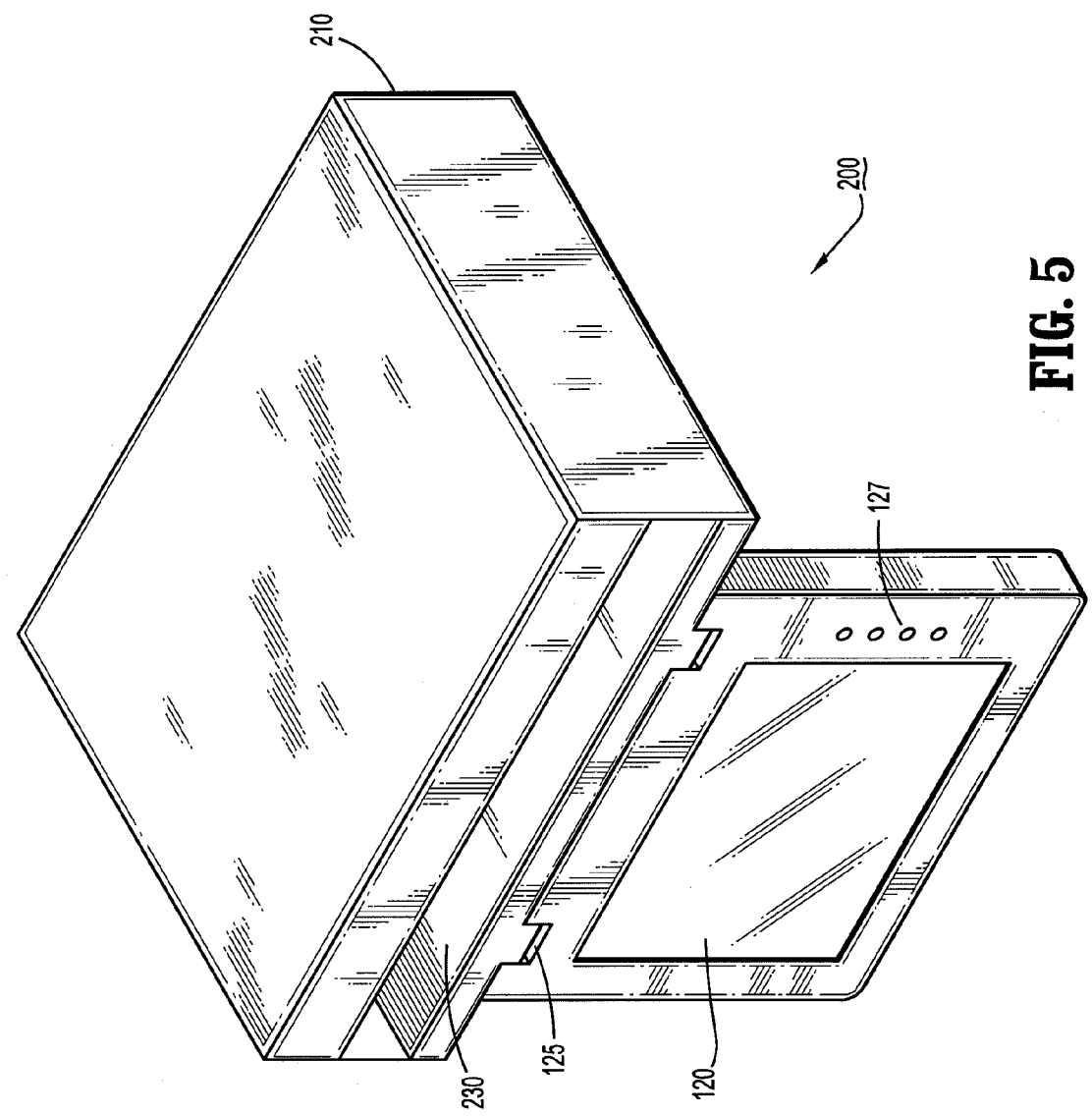
FIG. 5 shows a perspective view of an entertainment unit, according to an embodiment of the present invention.
Figure 6:
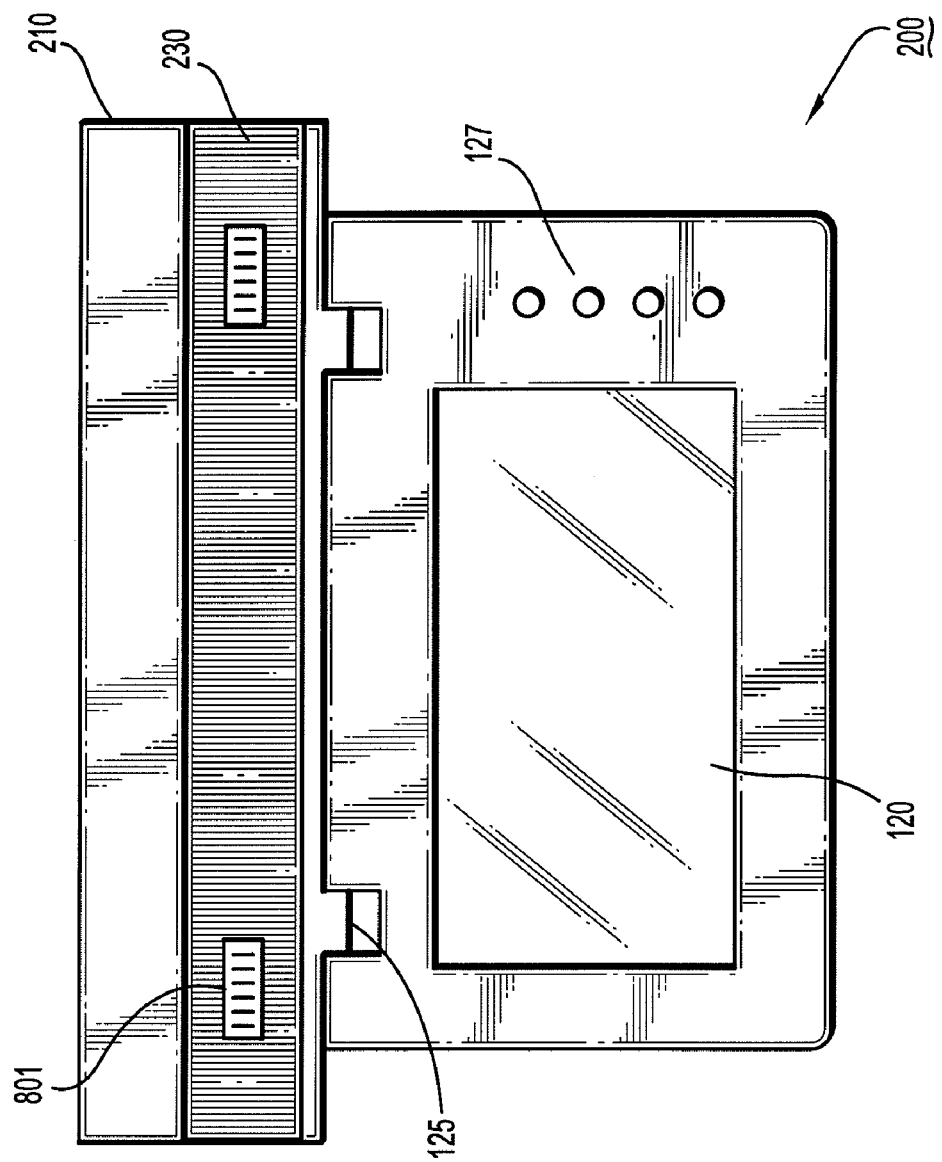
FIG. 6 shows a front view of the entertainment unit of FIG. 5, according to an embodiment of the present invention

Referring to FIGS. 5 and 6, the cavity 230 of entertainment unit 200 includes a hollowed out area in the center of the housing 210 and is accessed via an open portion of a front wall of the housing 210. Each of the remaining walls of the housing around the cavity 230 is closed. A media source layer fits into the cavity 230 such that a front portion of the media source layer sits flush or substantially flush with the front wall of the housing 210, allowing slots, controls and/or ports located on the front portion of the media source layer to be accessible by a user from the front of the entertainment unit 200.

Figure 7:
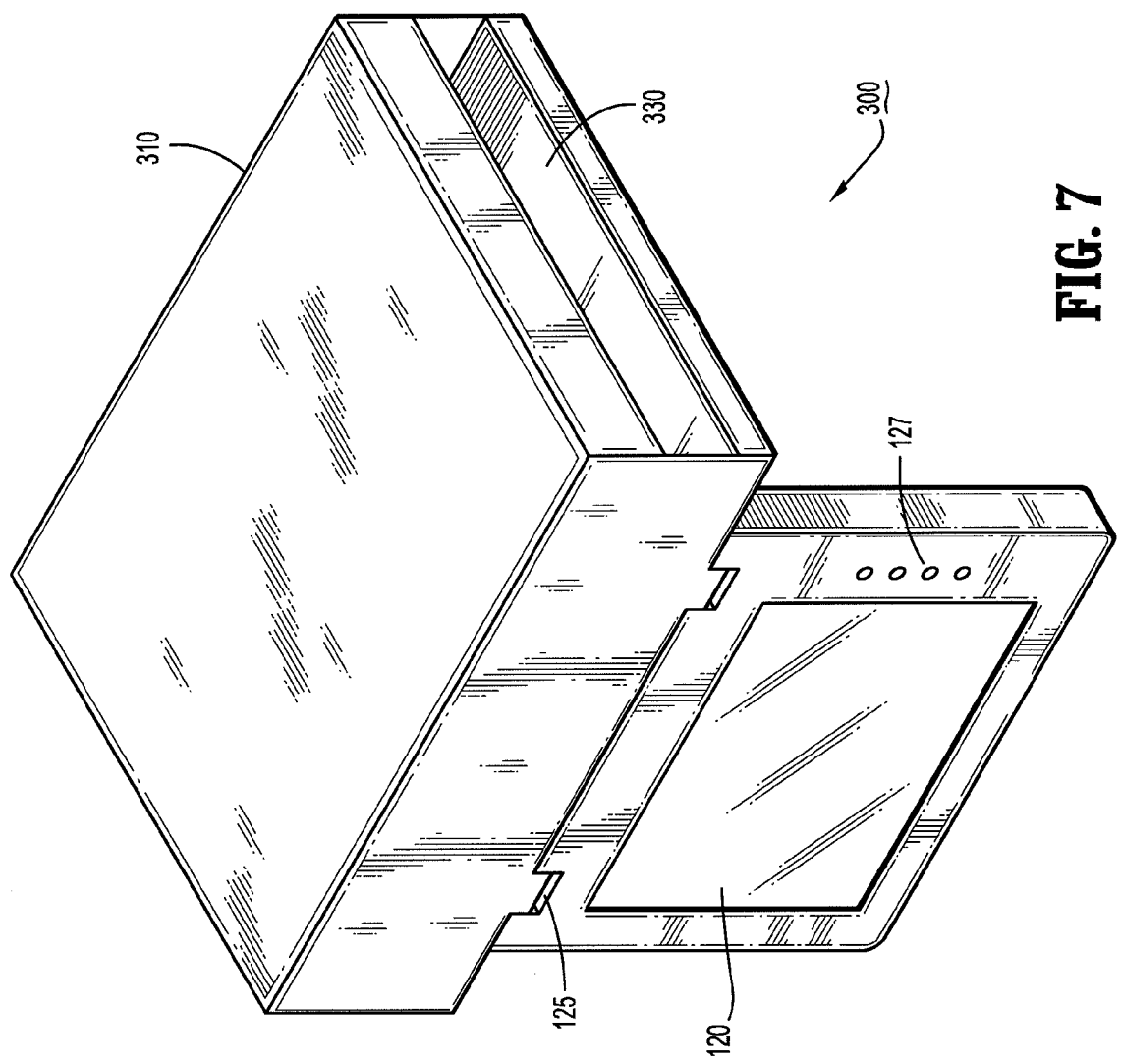
FIG. 7 shows a perspective view of an entertainment unit, according to an embodiment of the present invention.

Referring to FIG. 7, the cavity 330 of the entertainment unit 300 is similar to the cavity 230, in that the cavity 330 includes a hollowed out area in the center of the housing 310. In contrast to the cavity 230, the cavity 330 is accessed via an open portion of a side wall of the housing 310, with each of the remaining walls of the housing 310 around the cavity 330 being closed. Accordingly, a media source layer fits into the cavity 330 such that a front portion of the media source layer sits flush or substantially flush with the side wall of the housing 310, and slots, controls and/or ports located on the front portions of the media source layer are accessible by a user from the side of the entertainment unit 300.

Figure 8:
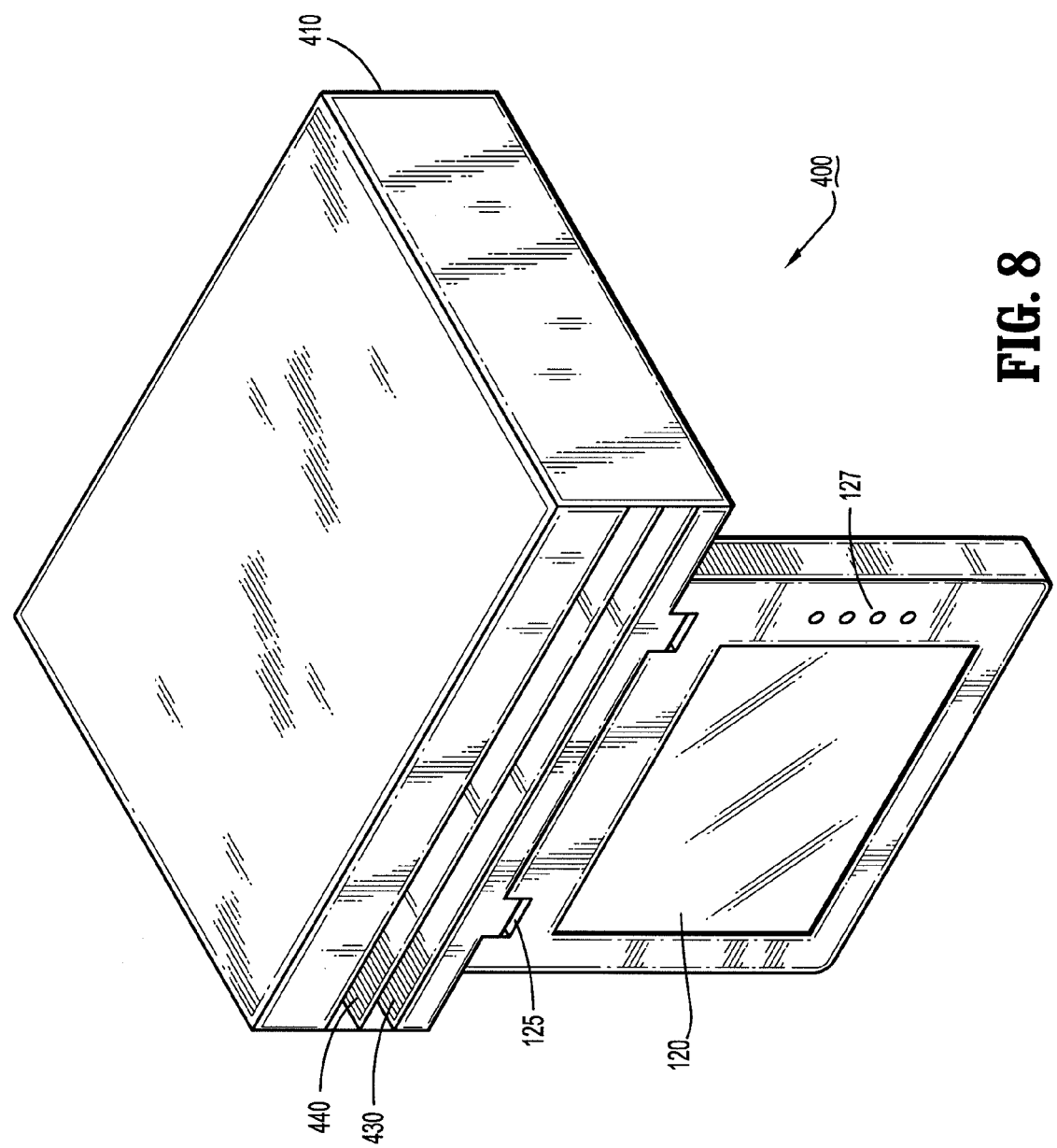
FIG. 8 shows a perspective view of an entertainment unit, according to an embodiment of the present invention.
Figure 9:
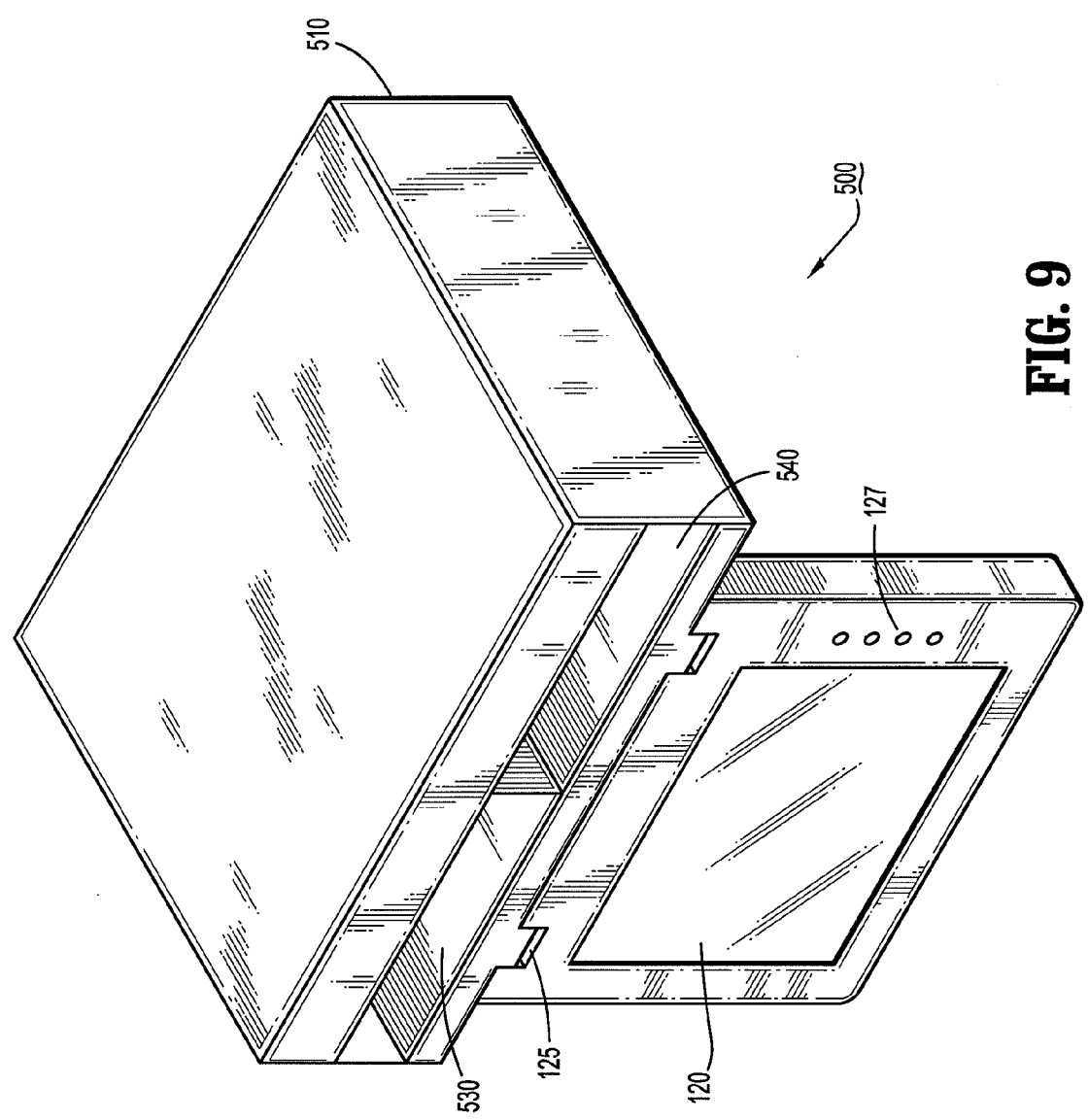
FIG. 9 shows a perspective view of an entertainment unit, according to an embodiment of the present invention.

FIGS. 8 and 9 show entertainment units with more than one cavity for accommodating more than one media source layer. For example, FIG. 8 illustrates an entertainment unit 400 having cavities 430 and 440 stacked one on top of the other. Like the cavity 230, the cavities 430 and 440 include hollowed out areas in the center of the housing 410 and are accessed via open portions of a front wall of the housing 410. Each of the remaining walls of the housing around the cavities 430 and 440 is closed. First and second media source layers respectively fit into the cavities 430 and 440 such that front portions of the media source layers sit flush or substantially flush with the front wall of the housing 410, allowing slots, controls and/or ports located on the front portions of the media source layers to be accessible by a user from the front of the entertainment unit 400.

It is to be understood, that like the cavity 330, the cavities 430 and 440 can be positioned such that access thereto is through an open portion of a side wall of the entertainment unit 400.

Figure 10:
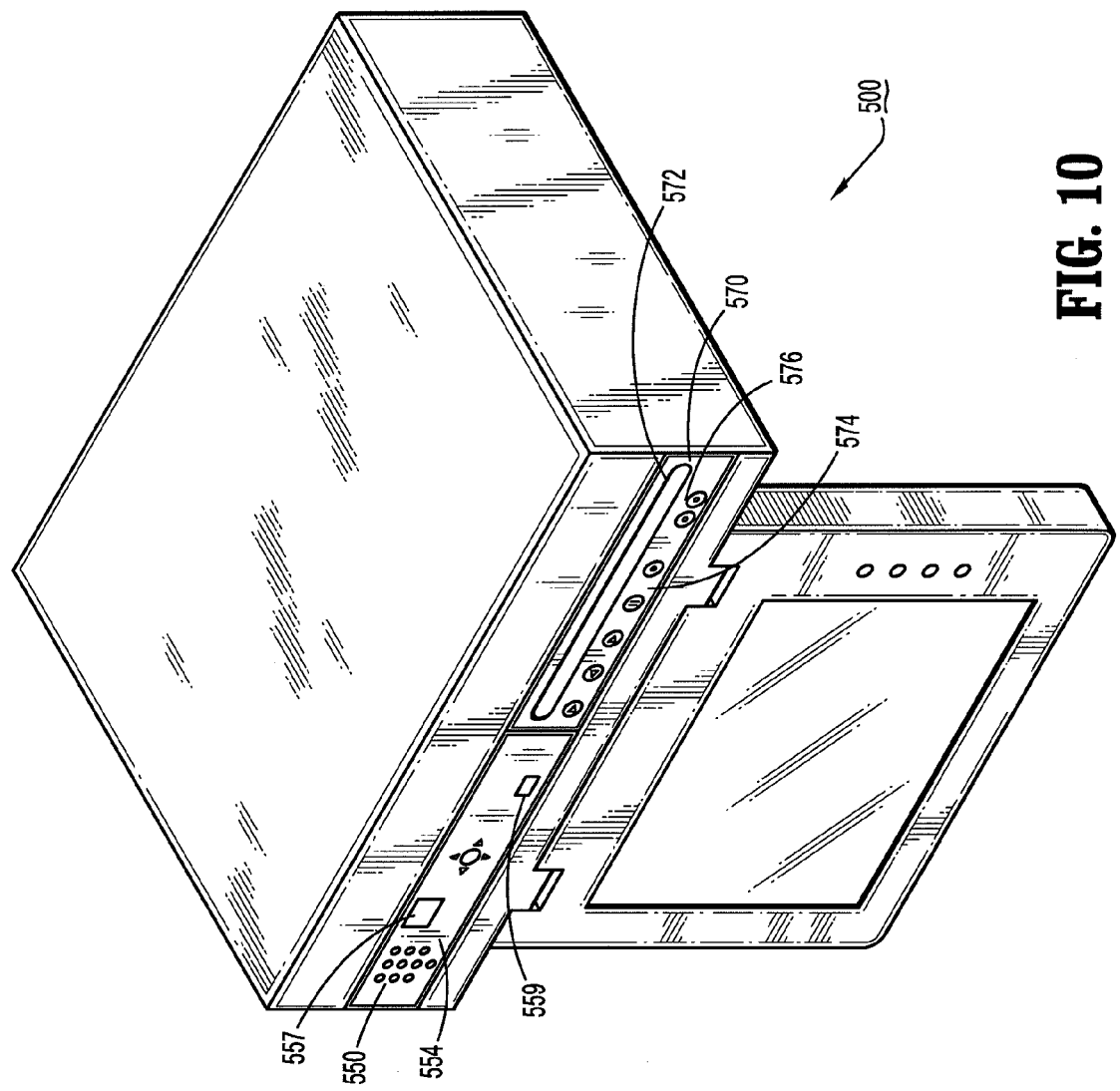
FIG. 10 shows a perspective view of the entertainment unit of FIG. 9 including multiple media source layers positioned therein, according to an embodiment of the present invention.

Referring to FIG. 9, an entertainment unit 500 includes cavities 530 and 540 positioned side by side. Like the cavity 230, the cavities 530 and 540 include hollowed out areas in the center of the housing 410 and are accessed via open portions of a front wall of the housing 510. Each of the remaining walls of the housing around the cavities 530 and 540 is closed. As shown in FIG. 10, first and second media source layers 550 and 570 respectively fit into the cavities 530 and 540 such that front portions of the media source layers sit flush or substantially flush with the front wall of the housing 510, allowing slots, controls and/or ports located on the front portions of the media source layers to be accessible by a user from the front of the entertainment unit 500.

It is to be understood, that like the cavity 330, the cavities 530 and 540 can be positioned such that access thereto is through an open portion of a side wall of the entertainment unit 400.

It is to be further understood that the configuration of the cavities 130, 230, 330, 430, 440, 530 and 540 may be varied to permit access to the cavities from a back wall or either side wall of the housing of an entertainment unit. Multiple media source layers positioned in an entertainment unit may play the same or different types of media.

The media source layers can be secured to the housings using the configuration described with reference to FIG. 12A. Alternatively, or in addition to the FIG. 12A configuration, the housings 110-510 can include a latch mechanism for securing and releasing the media source layers inserted in cavities 130, 230, 330, 430, 440, 530 and 540. Referring to FIG. 12B, the latch mechanism is positioned in the housing 110-510 and includes a button 702 protruding through a wall (e.g., a side wall) of the housing 110-510. When pressed, the button 702 shifts the position of a latch 703, such that the latch 703 is free to pass through a hole 701 in a wall (e.g., a back wall) of a media source layer, such as media source layer 150, 550, 570 or any other media source layer compatible with a particular cavity 130, 230, 330, 430, 440, 530, 540. When the button 702 is released, a spring 704 returns the latch 703 to its original position, securing the media source layer to the housing. To remove the media source layer from the housing 110-510, the button 702 is pressed to align the latch 703 with the opening 701 in the media source layer and the media source layer is pulled away from the housing 110-510.

Figure 12B:
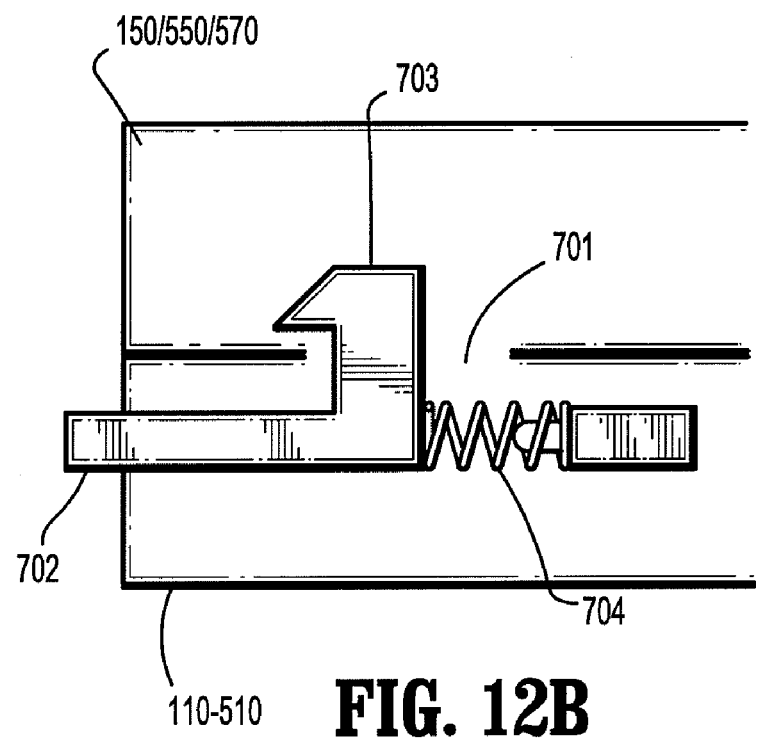
Figure 12C:
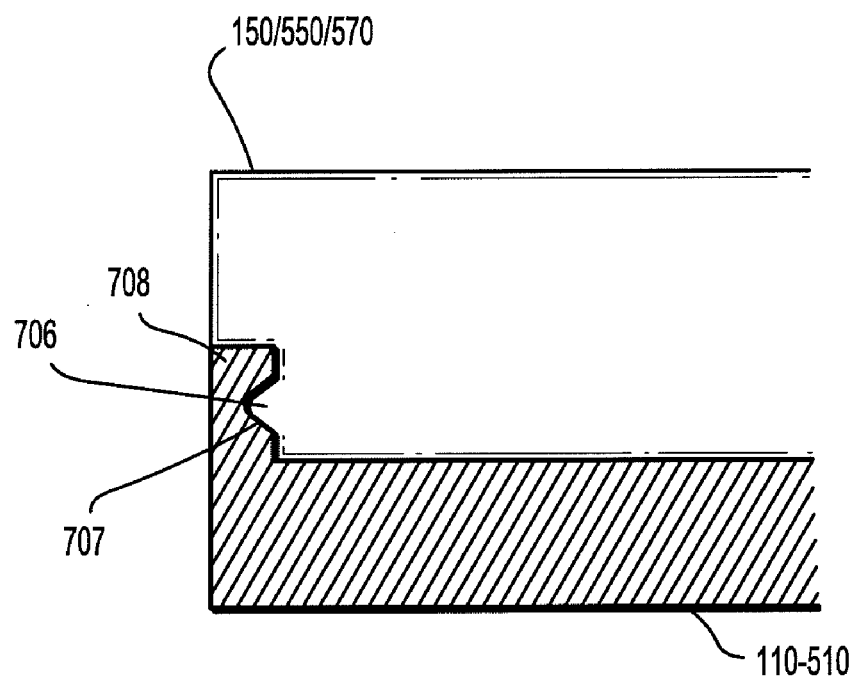

As shown in FIG. 12C, a media source layer, such as media source layer 150, 550, 570 or any other media source layer compatible with a particular cavity 130, 230, 330, 430, 440, 530, 540, can be secured by a convex portion 706 preferably positioned on a side adjacent a back wall of the media source layer. The convex portion is designed to fit within a concave portion 707 located in a wall 708 of the housing 110-510 (e.g., a side wall if the media source layer is being inserted into a cavity through an opening in the front wall of the housing). As the media source layer is pressed into the cavity, the wall 708 of the housing 110-510 flexes away from the media source layer until the convex portion 706 is aligned with the concave portion 707. The convex portion 706 and the concave portion 707 cooperate to secure the media source layer in the cavity of the housing 110-510. Thus, a wall 708 of the housing 110-510 surrounding the cavities 130, 230, 330, 430, 440, 530, 540 can be formed of, for example, a flexible thermoplastic rubber.

Figure 12D:
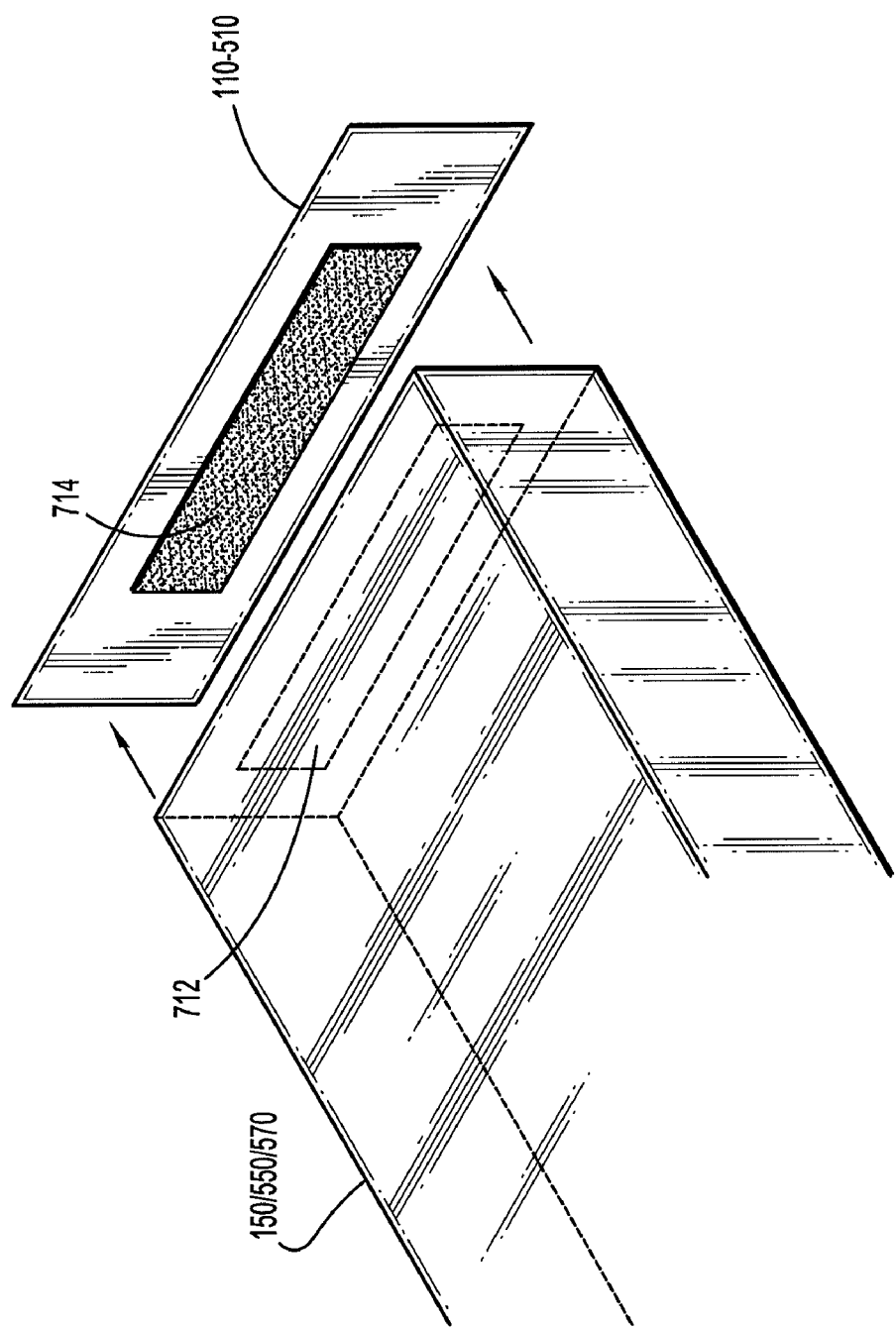

Other means of securing the media source layers in the cavities 130, 230, 330, 430, 440, 530, 540 of the housings 110-510 are contemplated, such as, snaps, Velcro and the like. As shown in FIG. 12D, Velcro strips 712 are fixed to a wall(s) of the media source layer, such as media source layer 150, 550, 570 or any other media source layer compatible with a particular cavity 130, 230, 330, 430, 440, 530, 540, for mating with pads 714 fixed to a wall(s) of a housing 110-510 to secure the media source layers in the cavities 130, 230, 330, 430, 440, 530, 540.

Figure 12E:
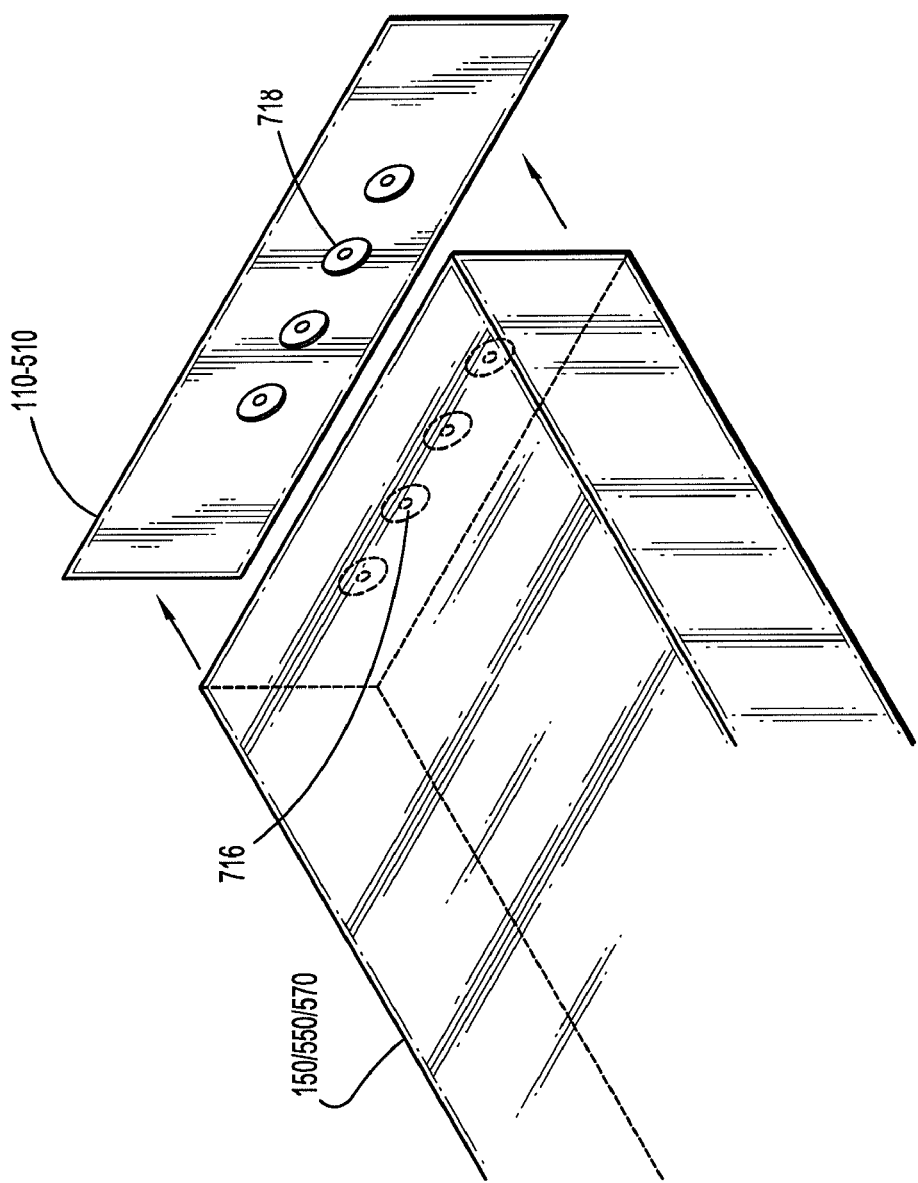

As shown in FIG. 12E, magnetic or non-magnetic snaps 716 are fixed to a wall(s) of the media source layer, such as media source layer 150, 550, 570 or any other media source layer compatible with a particular cavity 130, 230, 330, 430, 440, 530, 540, for mating with recesses 718 fixed to a wall(s) of a housing 110-510 for receiving the snaps to secure a media source layer in the cavities 130, 230, 330, 430, 440, 530, 540. It is to be understood that the Velcro strips 712 and the snaps 716 may be fixed to the housing while the pads 714 and the recesses 718 are fixed to the media source layers.

A handle or indentation (not shown) can be positioned on the front face of a media source layer to provide a gripping portion so that a user may pull the media source layer out of a cavity.

Given the open configuration of the cavity 130, the securing devices illustrated in FIGS. 12A, 12D and/or 12E or a combination of same with the devices of FIGS. 12B and/or 12C are preferably used to ensure that the media source layer 150 is not unintentionally dislodged from the entertainment unit 100.

As stated above in connection with entertainment unit 10, each media source layer includes a media source such as a DVD player, a CD-ROM player, a video game player, a VCP, a television or radio tuner, a wireless receiver and tuner for playing media received via wireless techniques such as 802.11, Bluetooth®, cellular transmission, including CDMA or other technology using spread-spectrum techniques, and satellite transmission, an MPEG player, a portable personal computer, or a DVR or similar device capable of downloading, recording, storing (e.g., on a storage device, such as a hard disk) and/or playing video and/or audio files or programs. The portable personal computer can include, for example, capability to receive and transmit e-mail and access the Internet via wireless techniques.

The media source may also include a device for playing media supplied from a mass storage device, wherein the mass storage device includes, for example, a memory card or a keydrive. The media source layer may also include any combination of the above media sources. Media source layers 50, 150 and 570 are illustrated with a DVD player and media source layer 550 is illustrated as having a TV tuner.

Referring to FIGS. 3 and 6, for example, a wall of the housing 110-510 bordering the cavities 130, 230, 330, 430, 440, 530, 540 includes an electrical connector(s) 801, such as a pin array, an F-connector, an RCA jack, an S-connector, an XLR jack and the like, for connecting to a corresponding or mating electrical connector located on the media source layer. When the media source layer(s) is secured to the housing, power and data, such as video and audio, are transferred to and from the media source layer(s) via the electrical connectors. Thus, a media source(s) included in a media source layer can be connected to external devices through the housing 110-510. The external devices include, for example, a slave video display unit installed in another part of the vehicle, a security system, and a vehicle sound system.

A media source layer(s) may also be connected to the vehicle's power supply through the housing. The housing 110-510 can be coupled to a vehicle's electrical system and connected to a vehicle's power supply, e.g., 12 Volts, through, for example, a wiring harness. Power can be supplied to the media source layer(s) through the electrical connectors, for example, electrical connector 801. The housing 110-510, and, in turn, a media source layer, can also be connected to a vehicle's data communication bus, which can carry data from and to a media source layer to and from the external devices.

The display 120 of the entertainment units 100-500 can be operatively coupled to the media source(s) directly via wires or some other electrical connectors, or through the housing 110-510, via, for example, electrical connectors, such as connector 801.

Transfer of data may be obtained through electrical connectors, such as connector 801. For example, video signals from a media source layer can be provided via the electrical connectors to the display 120 coupled to the housing for producing a video image on the display 120. Similarly, audio data may be transferred through the connectors to the display 120, speakers and/or headphones coupled to the housing for producing sound associated with a video image.

Further, audio and video data may be sent to displays, speakers or headphones remote from the housing 110-510 via wireless transmission. As shown in FIG. 4, the media source layer 150 includes a wireless transmitter(s) 158 for wirelessly transmitting video and/or audio data to remote displays, speakers and/or headphones directly from a media source. The wireless transmitter(s) may include an RF transmitter, an optical transmitter (e.g. an IR transmitter), or a combination thereof.

When a media source layer is not inserted in the housing 110-510 of an entertainment unit 100-500, an entertainment unit 100-500 operates with a media source, such as a (VCP) positioned remote from the entertainment unit, such as under a vehicle seat. A connection to the remote media source may be achieved through the vehicle's wiring harness or via wireless techniques.

In addition, more than one media source may operate with an entertainment unit 100-500 at the same time so that multiple passengers in a vehicle may simultaneously view separate programs on different displays and/or listen to different programs through different audio mechanisms (e.g., through separate headphone sets). For example, referring to FIG. 10, multiple media sources, such as those found in media source layers 550 and 570, can provide different video programs to two respective displays. Specifically, the TV tuner of media source layer 550 may provide a first program via electrical connectors, such as connector 801 to display 120, which is electrically connected to connector 801, and media source layer 570 may provide a second video program to another display positioned remote from the housing 510 and electrically connected to the media source layer 570 via electrical connector 801 and the vehicle's wiring harness. Program transmission may also occur between the media source layers and multiple displays via wireless transmission, wherein each program is transmitted on a different channel and/or encoded to avoid interference.

Alternatively, a first program may be provided to a first display from a media source layer positioned in a housing 110-510 and a second program may be provided to a second display from a media source remote from the entertainment unit 100-500. Displays, such as display 120, may include selector switches/buttons or wireless channel tuners to select the media source from which a program is to be received.

Referring to FIGS. 2, 4 and 10, each media source layer 50, 150, 550 and 570 includes control buttons 54, 154, 554 and 574 for controlling, for example, power, queuing (e.g., stop, pause, previous, play and next), and channel selection. In the case of a TV tuner, as included with media source layer 550, the control buttons may include a numeric keypad for channel selection and a display 557 for displaying a current channel. The TV tuner preferably receives and plays TV programs in accordance with National Television System Committee (NTSC) standards.

In the case of a DVD player, such as with media source layers 50, 150 and 570, the media source layer includes a slot 52, 152, 572 for receiving media, such as a DVD. Alternatively, media may be loaded using a drawer, which slides out from the media source layer, or a pop-open cover to expose an area on which the media, such as DVD, rests when played.

A media source layer may include audio and video input/output jacks 56, 156, 576 for connecting to, for example, headphones, portable displays or portable media sources. A media source layer can also include an infra-red (IR) sensor 59, 159, 559 for receiving signals for control of the entertainment unit 10, and 100-500 and the media source layer from a remote control device. A media source layer may also include jacks (not shown) for connecting a video game controller to the media source layer.

The entertainment units 10, 100-500 are preferably mounted to a ceiling (see, e.g., FIG. 11) of a vehicle, such as an automobile, bus, van, train, boat, airplane, etc. The entertainment units 10, 100-500 are connected to a remote media source, such as a VCP located, for example, under a vehicle seat.

The entertainment units 100-500 include at least one cavity for receiving a media source layer.

As an alternative to an overhead console, the entertainment units 10, 100-500 may be positioned elsewhere in a vehicle, such as on a center console of the vehicle, on a wall of the vehicle, or behind a vehicle seat.

Although the illustrative embodiments have been described herein with reference to the accompanying drawings, it is to be understood that the present invention is not limited to those precise embodiments, and that various other changes and modifications may be affected therein by one of ordinary skill in the related art without departing from the scope or spirit of the invention. All such changes and modifications are intended to be included within the scope of the invention as defined by the appended claims.

What is claimed is:

1. An entertainment system for a vehicle, comprising:
   a console section mounted on a surface in the vehicle;
   a media source layer including a media source stacked and mounted on the console section; and
   a screen section stacked and mounted on the media source layer, wherein the screen section includes a display and is capable of being stacked and mounted on the console section in place of the media source layer when the media source layer is removed from the console section.

2. The entertainment system of claim 1, wherein the media source includes at least one of a DVD player, a CD-ROM player, a video game player, a VCP, a television tuner, a radio tuner, a wireless receiver and tuner for playing media received via wireless techniques, an MPEG player, a portable personal computer, a digital video recorder, or a device for playing media supplied from a mass storage device.

3. The entertainment system of claim 2, wherein the wireless techniques include at least one of 802.11, Bluetooth, cellular transmission and satellite transmission.

4. The entertainment system of claim 1, wherein the console section includes an electrical connector for mating with an electrical connector on the media source layer for electrically connecting the media source layer to the console section.

5. The entertainment system of claim 4, wherein the media source layer receives power from a power supply of the vehicle via the electrical connectors.

6. The entertainment system of claim 1, wherein the media source layer includes an electrical connector for mating with an electrical connector on the screen section for electrically connecting the media source layer to the screen section and the display.

7. The entertainment system of claim 1, further comprising an additional media source layer mounted on the media source layer between the media source layer and the screen section, whereby the screen section is mounted on the additional media source layer.

8. The entertainment system of claim 1, wherein the media source layer is capable of being mounted on the console section such that a front panel of the media source layer faces the same direction as a front, a side or a rear of the vehicle.

9. The entertainment system of claim 1, further comprising a media source positioned remote from the media source layer and the console and screen sections and electrically connected to the display.

10. The entertainment system of claim 9, further comprising a selector for selecting whether a program from the media source of the media source layer or from the remote media source is supplied to the display.

11. The entertainment system of claim 9, wherein the remote media source is electrically connected to the display via a wiring harness.

12. The entertainment system of claim 9, wherein the remote media source is electrically connected to the display via wireless transmission and reception.

13. An entertainment system for a vehicle, comprising:
   a console section mounted on a surface in the vehicle;
   a media source layer including a media source mounted on the console section;
   a screen section mounted on the media source layer, wherein the screen section includes a display and is capable of being mounted on the console section when the media source layer is removed from the console section; and
   an additional media source layer mounted on the media source layer between the media source layer and the screen section, whereby the screen section is mounted on the additional media source layer.

* * * * *